United States Patent Office 3,168,565
Patented Feb. 2, 1965

3,168,565
TRIFLUOROMETHYL DERIVATIVES OF AMINO TRIARYLETHANOLS, -ETHANES, AND -ETHYLENES
Frank Patrick Palopoli and Vernon John Feil, Cincinnati, Ohio, assignors to Richardson-Merrell Inc., a corporation of Delaware
No Drawing. Filed Nov. 20, 1959, Ser. No. 854,270
9 Claims. (Cl. 260—570.7)

This invention relates to chemical compounds which possess useful physiological and other valuable properties and to a process for the preparation of these compounds.

The new compounds of the present invention are trifluoromethyl derivatives of basic substituted triphenylethanols, triphenylethylenes and triphenylethanes. They may be represented by the formula:

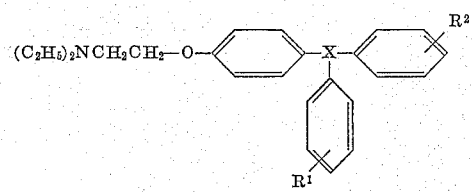

in which X is an ethanol

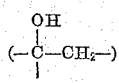

an ethylene

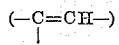

or an ethane

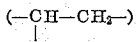

group, and in which one of the groups represented by $R^1$ and $R^2$ is a trifluoromethyl group. The remaining $R^1$ or $R^2$ group may be hydrogen, lower alkyl, halogen or lower alkoxy. This invention also includes the acid addition salts of these compounds.

The new and novel ethanols which have the formula:

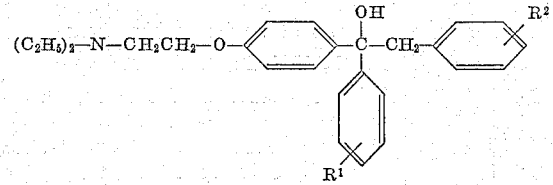

wherein $R^1$ and $R^2$ are as described above may be prepared by reacting a substituted benzyl magnesium bromide or chloride with a substituted benzophenone as described in the following examples. The basic substituted triarylethylene compounds may be readily prepared by dehydration of these triarylethanols as also described in the examples. The basic substituted triarylethane compounds may be prepared by hydrogenation of the triarylethylenes as described in the examples.

The new compounds of the present invention are characterized by having anti-inflammatory activity.

The preferred compounds of the present invention inhibit the formation of cholesterol.

Some of the compounds of the present invention are also characterized by having anti-estrogenic and pituitary gonadotrophin inhibiting activities.

The preparation of the new compounds of the present invention will now be illustrated by means of a number of specific examples.

EXAMPLE I

1-[p-(β-diethylaminoethoxy)phenyl]-1-(m-trifluoromethylphenyl)-2-(p-chlorophenyl)ethanol An ether solution containing 0.15 mole of p-chlorobenzylmagnesium chloride was added to 25 g. of p-(β-diethylaminoethoxy) - m' - trifluoromethylbenzophenone in 200 ml. of ether, and the mixture was refluxed for two hours. The complex was decomposed with a solution of ammonium chloride, the ether layer was removed and dried over magnesum sulfate. The ether was removed leaving an oil which would not crystallize; however, after partial purification of the citrate salt, the regenerated free base crystallized readily. The product, 1[p-(β-diethylaminoethoxy)phenyl] - 1 - (m-trifluoromethylphenyl)-2-(p-chlorophenyl)ethanol, melted at 109–110° C. after recrystallization from isopropanol.

The p-(β-diethylaminoethoxy) - m' - trifluoromethylbenzophenone was prepared by refluxing 31 g. of p-(β-diethylaminoethoxy)benzonitrile and the Grignard of 56 g. of m-bromobenzotrifluoride in ether for five hours. The complex was decomposed with an ammonium chloride solution, the ether layer was removed and extracted with dilute hydrochloric acid. The acid extracts were refluxed for six hours, made basic, and extracted with ether. The ether extracts were dried over magnesium sulfate, and the solvent was removed to yield the crude ketone. The product was purified by recrystallization of its oxalate salt from butanone, giving 32 g. melting at 98–100° C.

This compound, in addition to having anti-inflammatory activity, also has the effect of inhibiting the synthesis of cholesterol in the body.

EXAMPLE II

1-[p-(β-diethylaminoethoxy)phenyl]-1-(m-trifluoromethylphenyl)-2-phenylethanol

When p-chlorobenzylmagnesium chloride was replaced with benzylmagnesium chloride in the procedure of Example I, 1-[p-(β-diethylaminoethoxy)phenyl]-1-(m-trifluoromethylphenyl)-2-phenylethanol was obtained, melting at 105–107° C. (from ether-petroleum ether).

This compound, in addition to its anti-inflammatory activity, had anti-estrogenic activity and was a pituitary gonad inhibitor and cholesterol synthesis inhibitor.

EXAMPLE III

1-[p-(β-diethylaminoethoxy)phenyl]-1-(p-trifluoromethylphenyl)-2-(p-methoxyphenyl)ethanol When p-methoxybenzylmagnesium chloride was allowed to react with p-(β-diethylaminoethoxy)p'-trifluoromethylbenzophenone according to the procedure of Example I, the product 1-[p-(β-diethylaminoethoxy)phenyl]-1-(p - trifluoromethylphenyl)-2-(p-methoxyphenyl)ethanol, melting at 120–122.5° C., was obtained.

The intermediate p-(β-diethylaminoethoxy)-p'-trifluoromethylbenzophenone was obtained as in Example I, from p-(β-diethylaminoethoxy)benzonitrile and the Grignard from p-bromobenzotrifluoride, and melted at 62–65° C.

This compound had the same physiological activities as that of Example II.

EXAMPLE IV

1-[p-(β-diethylaminoethoxy)phenyl]-1-(p-trifluoromethylphenyl)-2-(p-chlorophenyl)ethanol When p-chlorobenzylmagnesium chloride replaced the p-methoxybenzylmagnesium chloride in Example III, the resulting product was 1 - [p - (β - diethylaminoethoxy)phenyl] - 1 - (p - trifluoromethylphenyl)-2-(p-chlorophenyl)ethanol, melting at 113–115° C.

This compound had activity as a cholesterol synthesis inhibitor as well as being an anti-inflammatory agent.

EXAMPLE V

*1-[-(β-diethylaminoethoxy)phenyl]-1-(p-tolyl)-2-(m-trifluoromethylphenyl)ethanol*

An ether solution containing 0.04 mole of m-trifluoromethylbenzylmagnesium chloride was added to 6.2 g. of p-(β-diethylaminoethoxy)-p'-methylbenzophenone and refluxed for two hours. After the complex was decomposed with a solution of ammonium chloride, the ether layer was removed and dried over magnesium sulfate. The solvent was removed leaving an oil which was converted to the citrate salt. The product, 1-[p-(β-diethylaminoethoxy)-phenyl]-1-(p-tolyl)-2-(m - trifluoromethylphenyl)ethanol dihydrogen citrate, melted at 154–155° C. after recrystallization from butanone.

The m-trifluoromethylbenzyl chloride, from which the Grignard reagent was prepared, was obtained by refluxing 27 g. of m-trifluoromethylbenzyl alcohol and 30 g. of thionyl chloride in benzene. The solvent and excess thionyl chloride were removed, and the residue was fractionated to yield m-trifluoromethylbenzyl chloride, $B_{.63}$ 105–106° C., $n_D^{25°}$ 1.4616.

While this compound had good anti-inflammatory activity, its activity as an inhibitor of the synthesis of cholesterol was somewhat lower than that of the previously described compounds.

EXAMPLE VI

*1-[p-(β-diethylaminoethoxy)phenyl]-1-(m-trifluoromethylphenyl)-2-(p-chlorophenyl)ethylene*

1-[p-(β-diethylaminoethoxy)phenyl] - 1 - (m-trifluoromethylphenyl)-2-(p-chlorophenyl)ethanol, Example I, was refluxed for two hours in an excess of alcoholic hydrogen chloride. The solvent was removed, and the residue was converted to the dihydrogen citrate salt via the free base. The product, 1-[p-(β-diethylaminoethoxy)-phenyl] - 1 - (m - trifluoromethylphenyl)-2-(p-chlorophenyl)-ethylene dihydrogen citrate, melted at 120–123° C. (from butanone).

EXAMPLE VII

*1-[p-(β-diethylaminoethoxy)phenyl]-1-(m-trifluoromethylphenyl)-2-phenylethane*

The ethanol product of Example II was dehydrated according to the procedure of Example VI. The crude ethylene hydrochloride so obtained was hydrogenated under three atmospheres of hydrogen pressure using 1 g. of Pd on charcoal as catalyst. The catalyst and ethanol solvent were removed, and the residue was converted to the free base. The hydrogen citrate salt of the product, 1-[p-(β-diethylaminoethoxy)phenyl] - 1 - (m - trifluoromethylphenyl)-2-phenylethane, melted at 106–107° C.

EXAMPLE VIII

*1-[p-(β-diethylaminoethoxy)phenyl]-1-(p-tolyl)-2-(m-trifluoromethylphenyl)ethylene*

When the ethanol of Example V was dehydrated according to the procedure of Example VI, the dihydrogen citrate salt of 1-[p-(β-diethylaminoethoxy)phenyl]-1-(p-tolyl)-2-(m-trifluoromethylphenyl)ethylene was obtained, melting at 125–128° C. (from butanone).

What we claim is:
1. Compounds of the group consisting of those having the general formulas

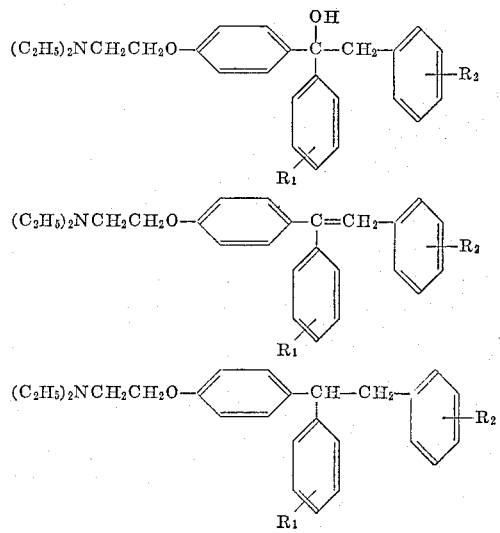

in which one of the groups represented by $R_1$ and $R_2$ is a trifluoromethyl group and the other is selected from the group consisting of lower alkyl, chloro and lower alkoxy.

2. 1-[p-(β-diethylaminoethoxy)phenyl] - 1 - (m - trifluoromethylphenyl)-2-(p-chlorophenyl)ethanol.

3. 1-[p-(β-diethylaminoethoxy)phenyl] - 1 - (m - trifluoromethylphenyl)-2-phenylethanol.

4. 1-[p-(β-diethylaminoethoxy)phenyl] - 1 - (p - trifluoromethylphenyl)-2-(p-methoxyphenyl)ethanol.

5. 1-[p-(β-diethylaminoethoxy)phenyl] - 1 - (p - trifluoromethylphenyl)-2-(p-chlorophenyl)ethanol.

6. 1-[p-(β-diethylaminoethoxy)phenyl] - 1 - (p - tolyl)-(m-trifluoromethylphenyl)ethanol.

7. 1-[p-(β-diethylaminoethoxy)phenyl] - 1 - (m - trifluoromethylphenyl)-2-(p-chlorophenyl)ethylene.

8. 1-[p-(β-diethylaminoethoxy)phenyl] - 1 - (m - trifluoromethylphenyl)-2-phenyl-ethane.

9. 1-[p-(β-diethylaminoethoxy)phenyl] - 1 - (p - tolyl)-2-(m-trifluoromethylphenyl)ethylene.

References Cited in the file of this patent
UNITED STATES PATENTS

| | | |
|---|---|---|
| 2,430,891 | Shelton | Nov. 18, 1947 |
| 2,914,562 | Allen et al. | Nov. 24, 1959 |
| 2,914,563 | Allen et al. | Nov. 24, 1959 |
| 2,914,564 | Allen et al. | Nov. 24, 1959 |
| 2,971,001 | Palopoli et al. | Feb. 7, 1961 |